US012729759B2

(12) United States Patent
Kanaoka

(10) Patent No.: US 12,729,759 B2
(45) Date of Patent: Sep. 8, 2026

(54) ROTARY ACTUATOR UNIT, AND JOINT UNIT FOR ROBOT OR HEAVY EQUIPMENT PROVIDED WITH SAME

(71) Applicant: Man-Machine Synergy Effectors, Inc., Shiga (JP)

(72) Inventor: Katsuya Kanaoka, Shiga (JP)

(73) Assignee: Man-Machine Synergy Effectors, Inc., Shiga (JP)

(*) Notice: Subject to any disclaimer, the term of this patent is extended or adjusted under 35 U.S.C. 154(b) by 41 days.

(21) Appl. No.: 18/841,872

(22) PCT Filed: Feb. 28, 2023

(86) PCT No.: PCT/JP2023/007369
§ 371 (c)(1),
(2) Date: Mar. 18, 2025

(87) PCT Pub. No.: WO2023/163222
PCT Pub. Date: Aug. 31, 2023

(65) Prior Publication Data

US 2025/0230864 A1 Jul. 17, 2025

(30) Foreign Application Priority Data

Feb. 28, 2022 (JP) ................................ 2022-030250

(51) Int. Cl.
*F16H 37/12* (2006.01)
*B25J 9/10* (2006.01)
*B25J 9/12* (2006.01)

(52) U.S. Cl.
CPC ........... *F16H 37/122* (2013.01); *B25J 9/106* (2013.01); *B25J 9/126* (2013.01)

(58) Field of Classification Search
CPC ........ B25J 9/009; B25J 9/0072; B25J 9/0021; B25J 9/123; B25J 9/126; B25J 9/106; F16H 37/122

(Continued)

(56) References Cited

U.S. PATENT DOCUMENTS

2004/0024385 A1* 2/2004 Stuart .................... B25J 9/1065 606/1
2009/0120404 A1* 5/2009 Brickley ................ F02B 75/32 123/52.1
2011/0209569 A1* 9/2011 Ribeiro .................. F16H 21/32 74/25

FOREIGN PATENT DOCUMENTS

JP 2012-067809 A 4/2012

OTHER PUBLICATIONS

Yamada, H., Development of a Torque Sensitive Radial Crank-type Continuously Variable Transmission and the Application to a Quadruped Robot, JSME Conference on Robotics and Mechatronics, May 27, 2012, No. 2A2-V05, 4 pages.

* cited by examiner

*Primary Examiner* — T. Scott Fix
(74) *Attorney, Agent, or Firm* — Hodgson Russ LLP

(57) ABSTRACT

Provided is a rotary actuator unit using simple link structure, and a robot joint unit employing the same. The rotary actuator unit comprises a first input part 10, a second input part 20, an output link member 30, an intermediate link member 40, an output side shaft OP, an intermediate shaft MP, and an input side shaft IP. The first input part 10 and the second input part 20 constitute an input side link mechanism L1 having two degrees of freedom. The intermediate link member 40 and the output link member 30 constitute an output side link mechanism L2. A tip of the input side link mechanism L1 and a base end of the output side link (Continued)

mechanism L2 are rotatably supported around the input side shaft IP. A two dimensional position of the input side shaft IP is freely manipulated by controlling a first liner actuator 11 of the first input part 10 and a second linear actuator 21 of the second input part 20. A rotation of the output link member around the output shaft OP is used as an output.

13 Claims, 11 Drawing Sheets

(58) Field of Classification Search
USPC .............................................................. 74/25
See application file for complete search history.

[FIG. 1]
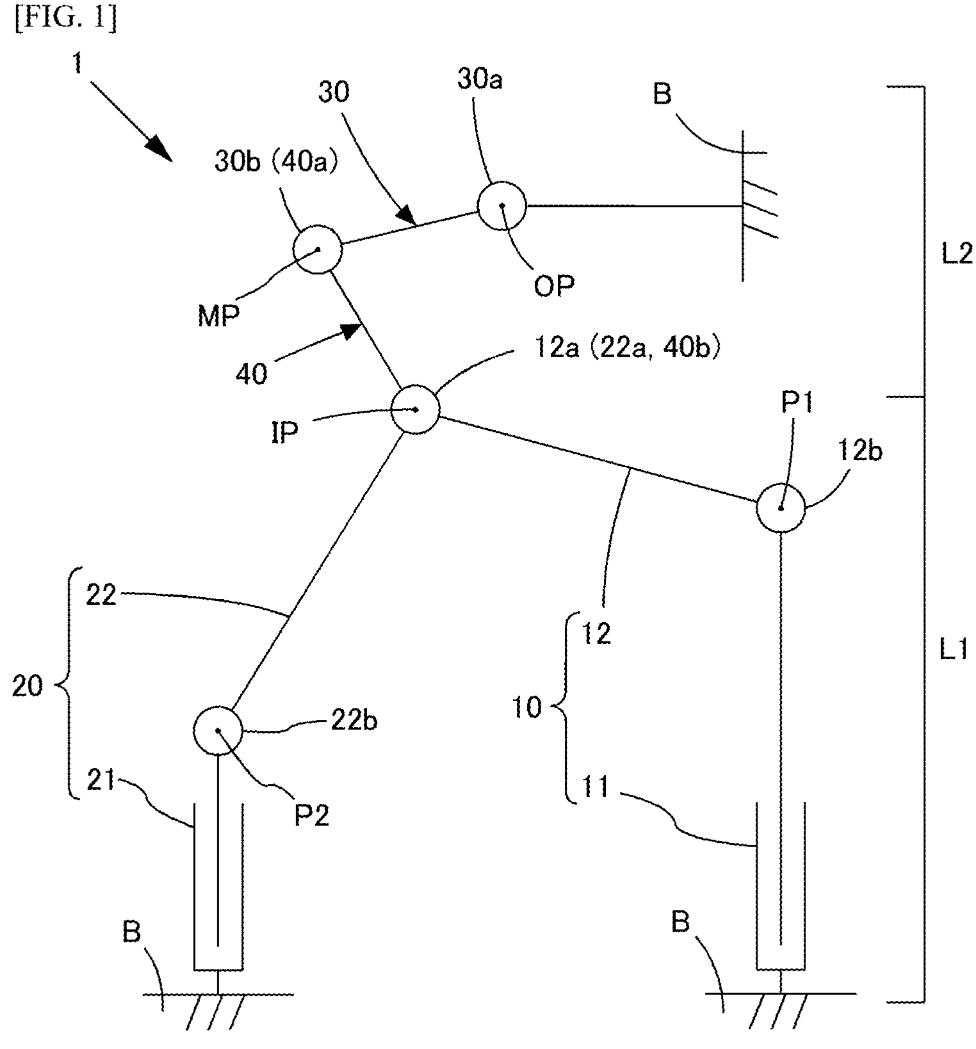

[FIG. 2]
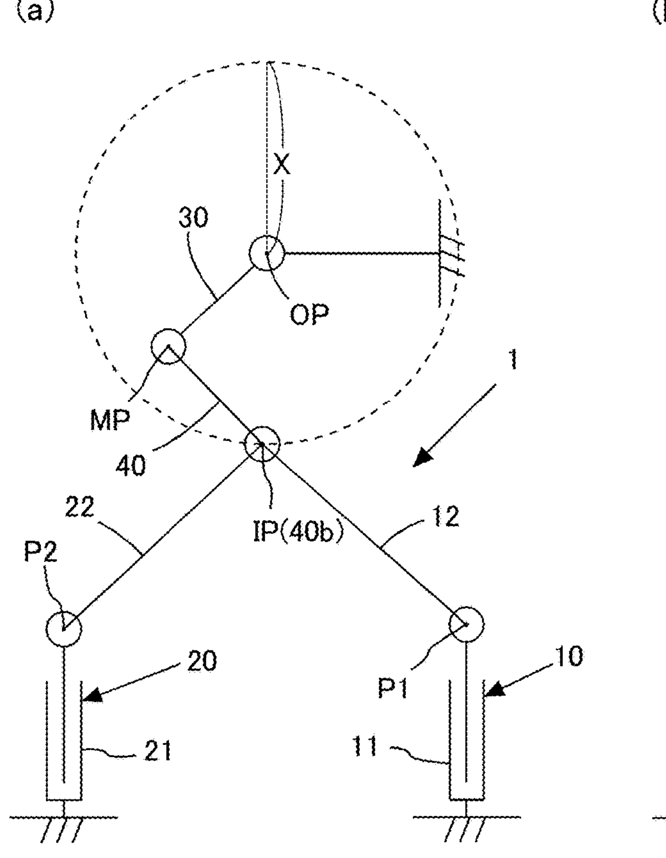
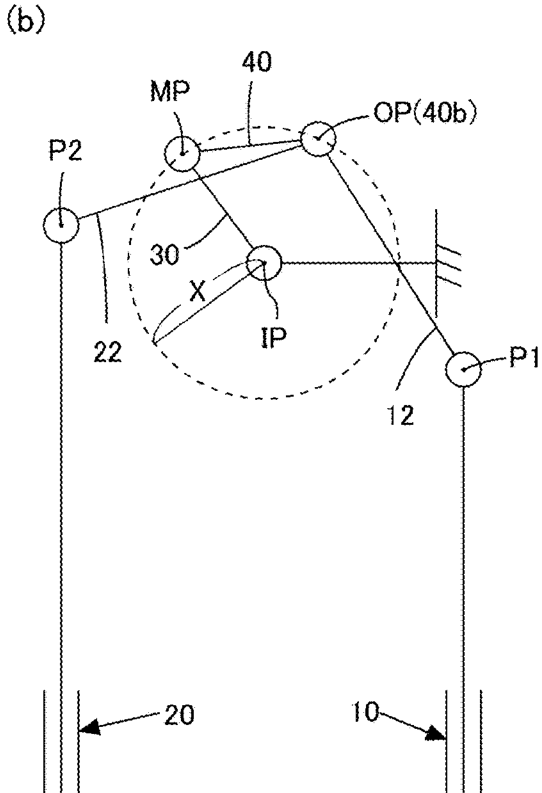
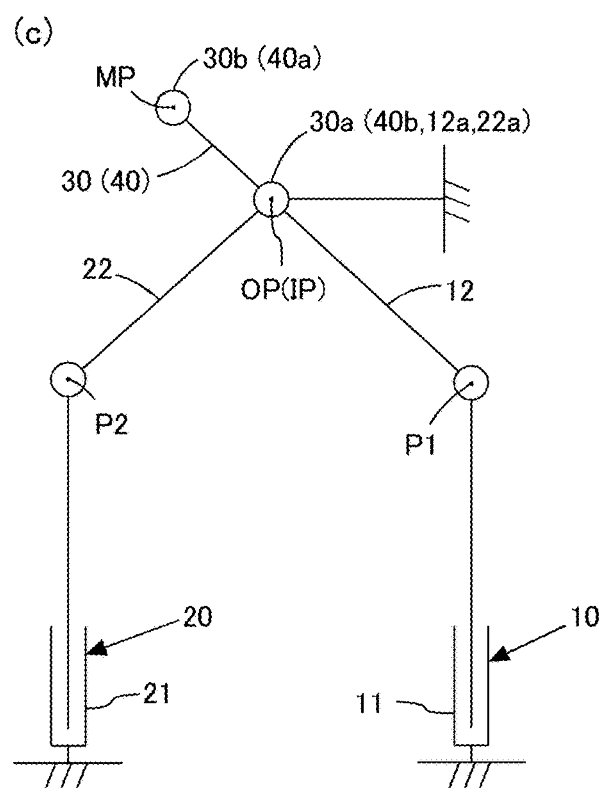

[FIG. 3]
(a)
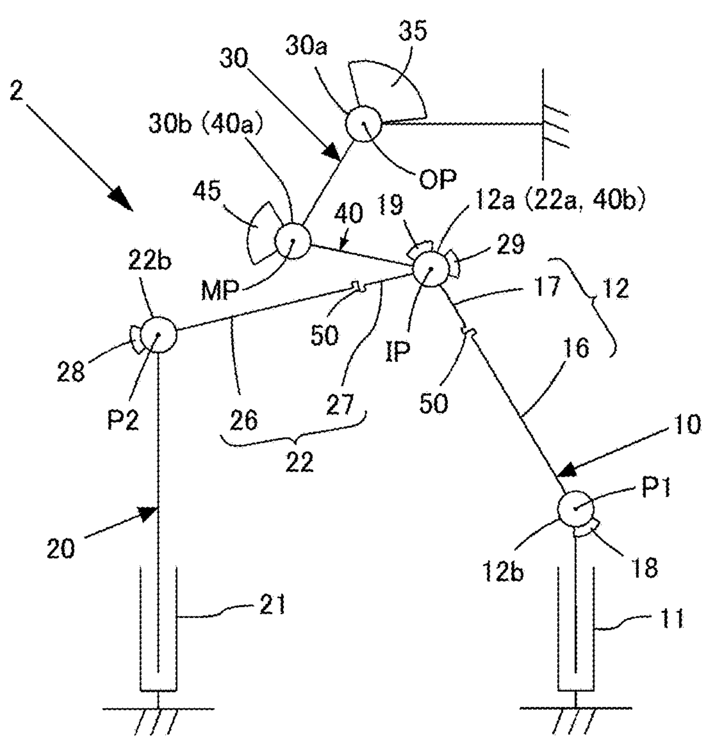
(b)
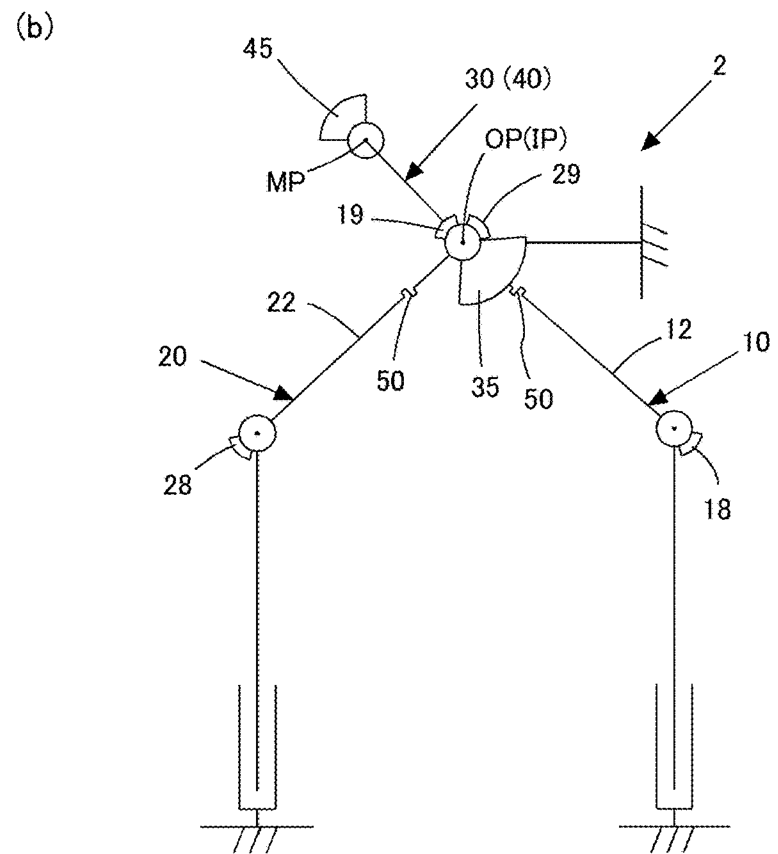

[FIG. 4]
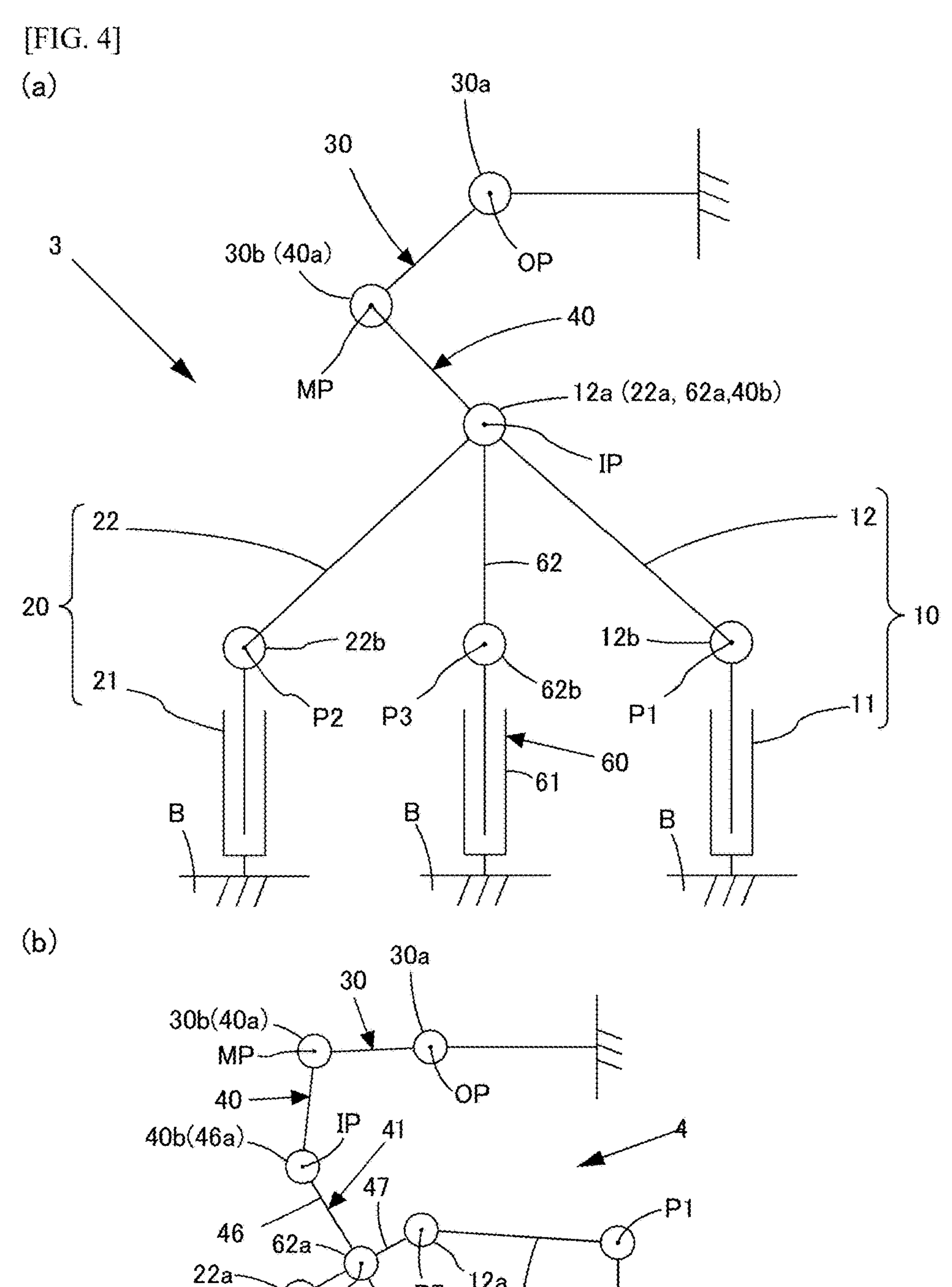

[FIG. 5]
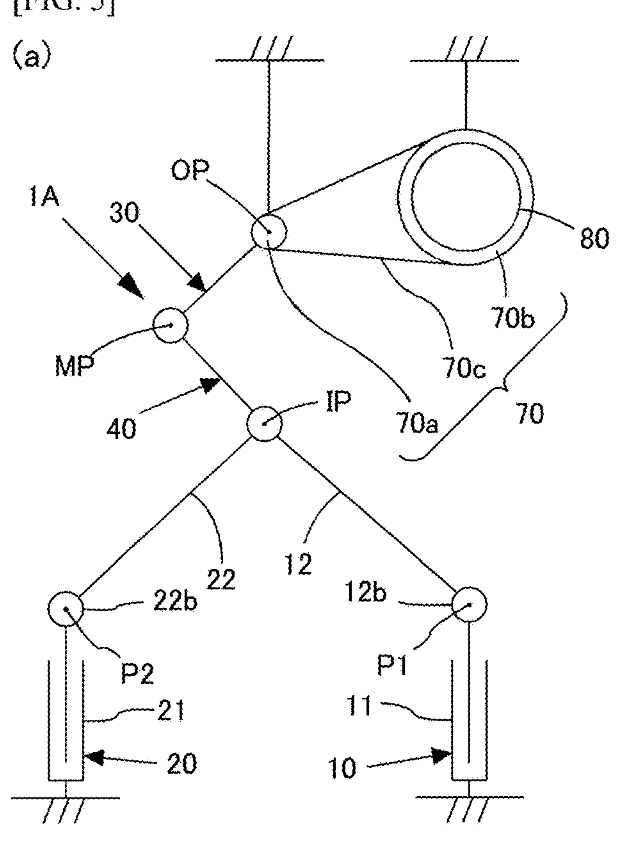
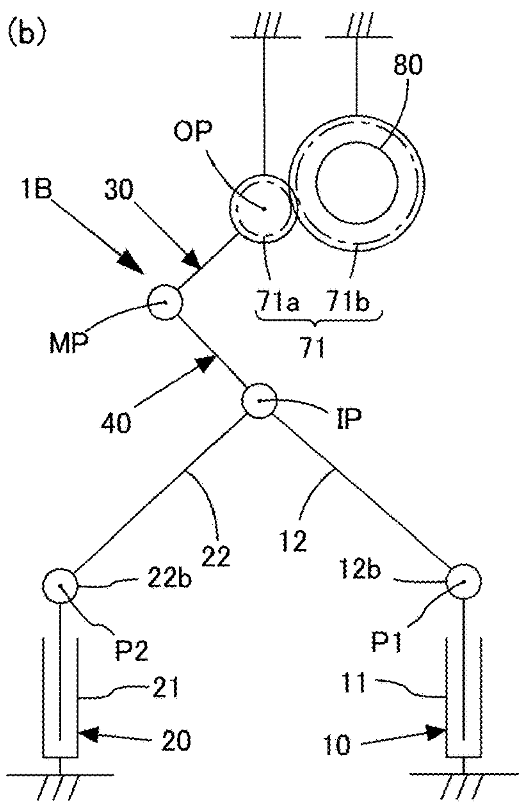
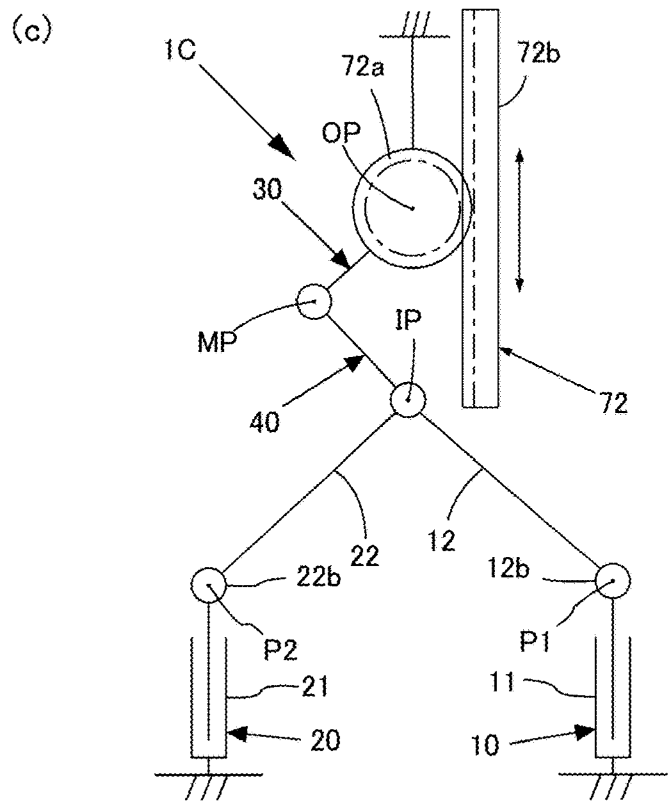

[FIG. 7]
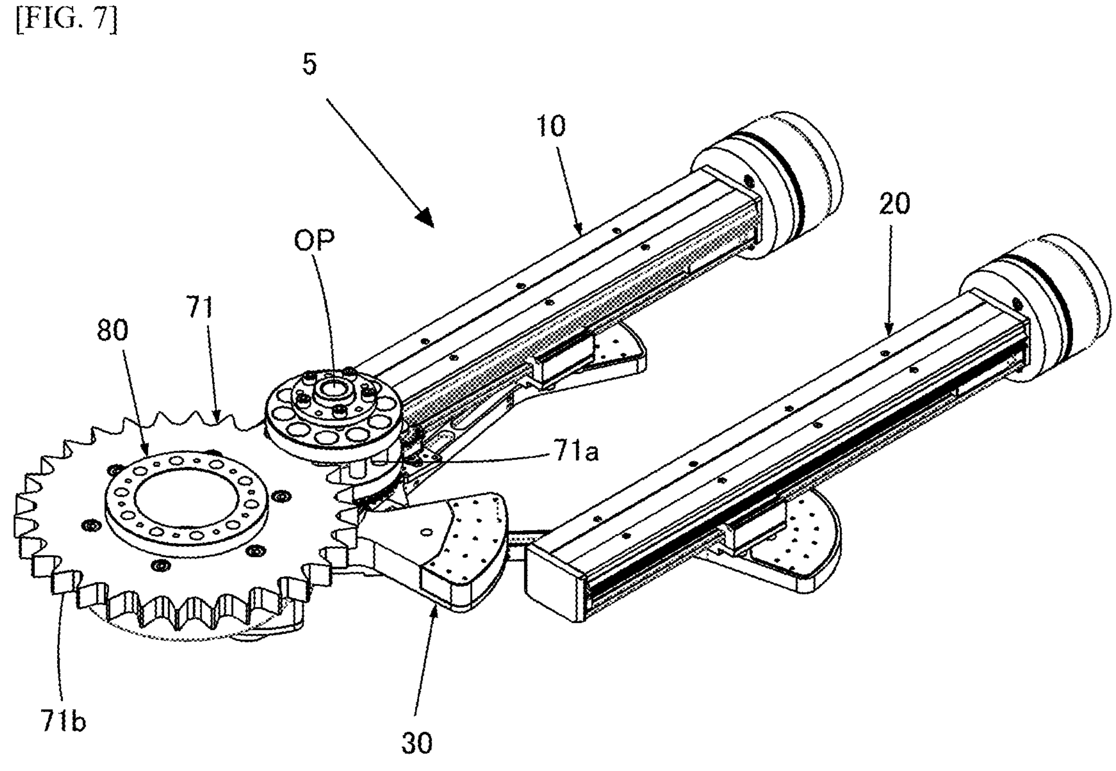

[FIG. 8]
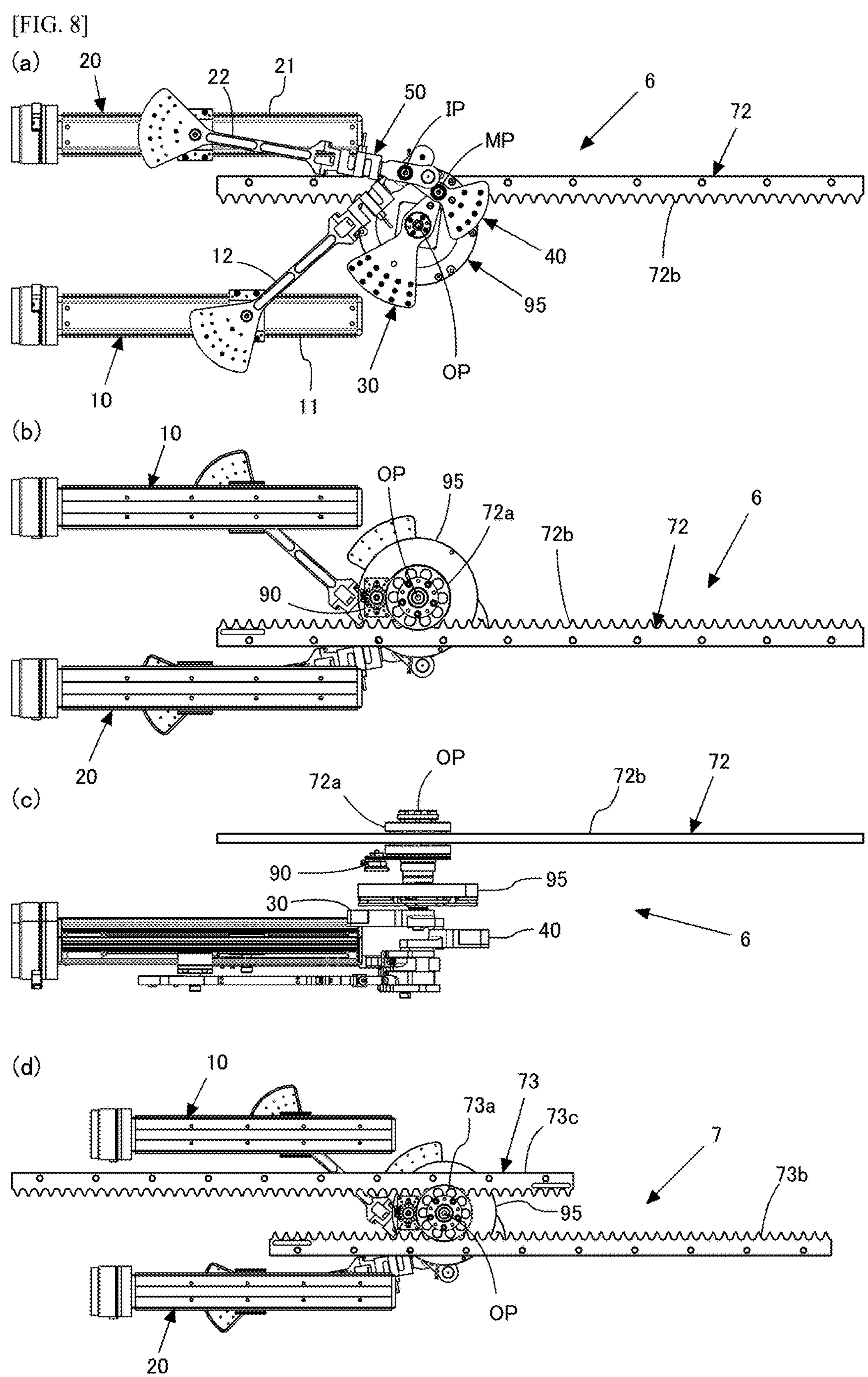

[FIG. 9]
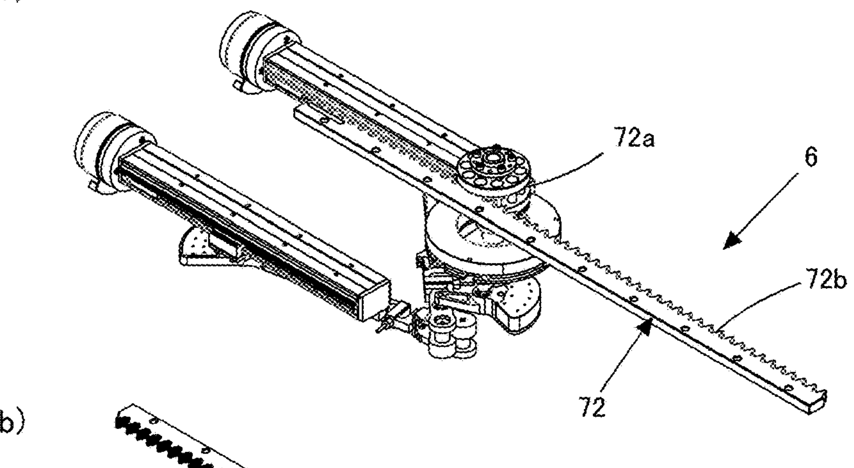
(b)
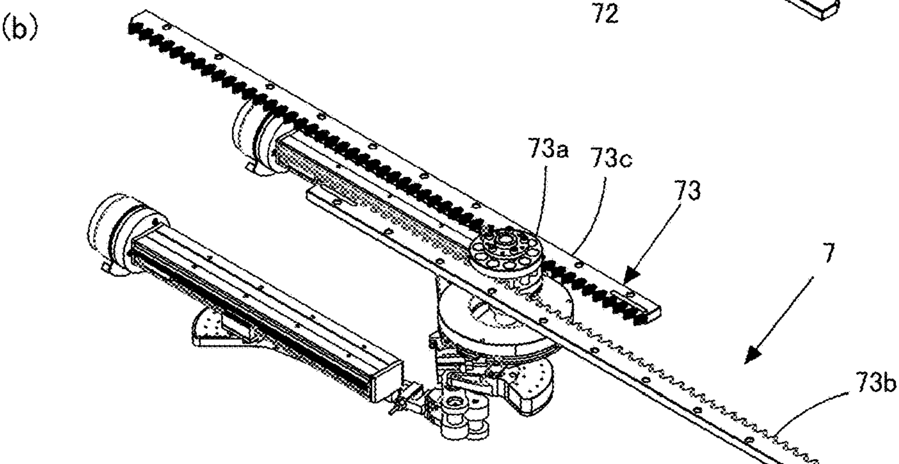
(c)
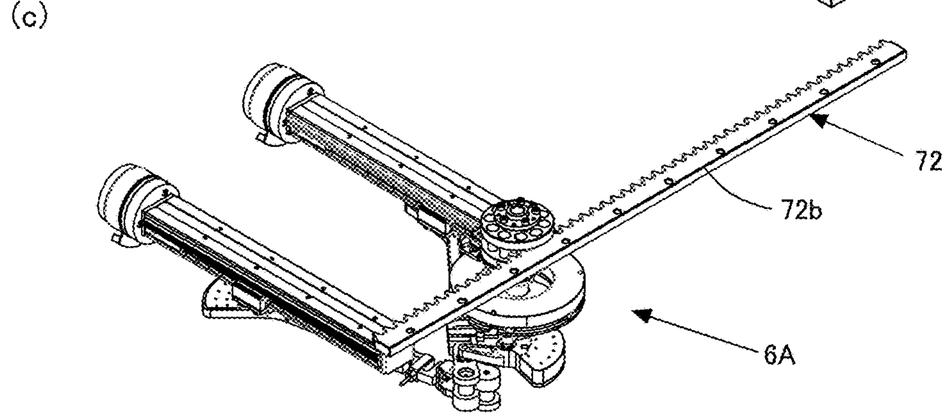
(d)
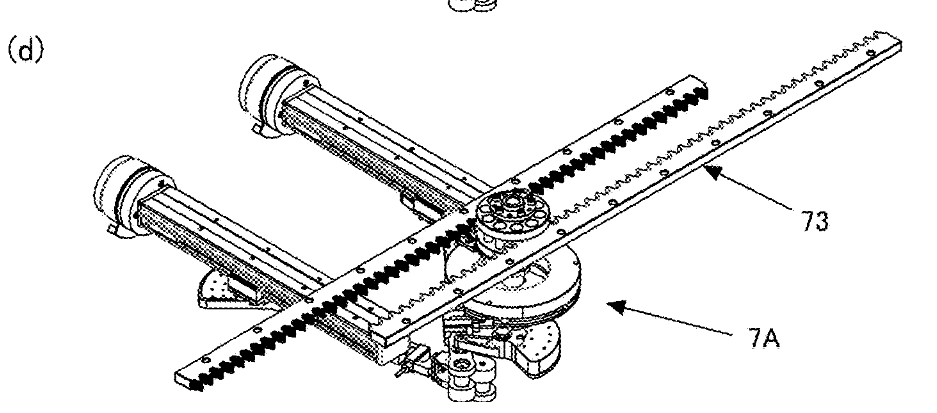

[FIG. 10]

[FIG. 11]
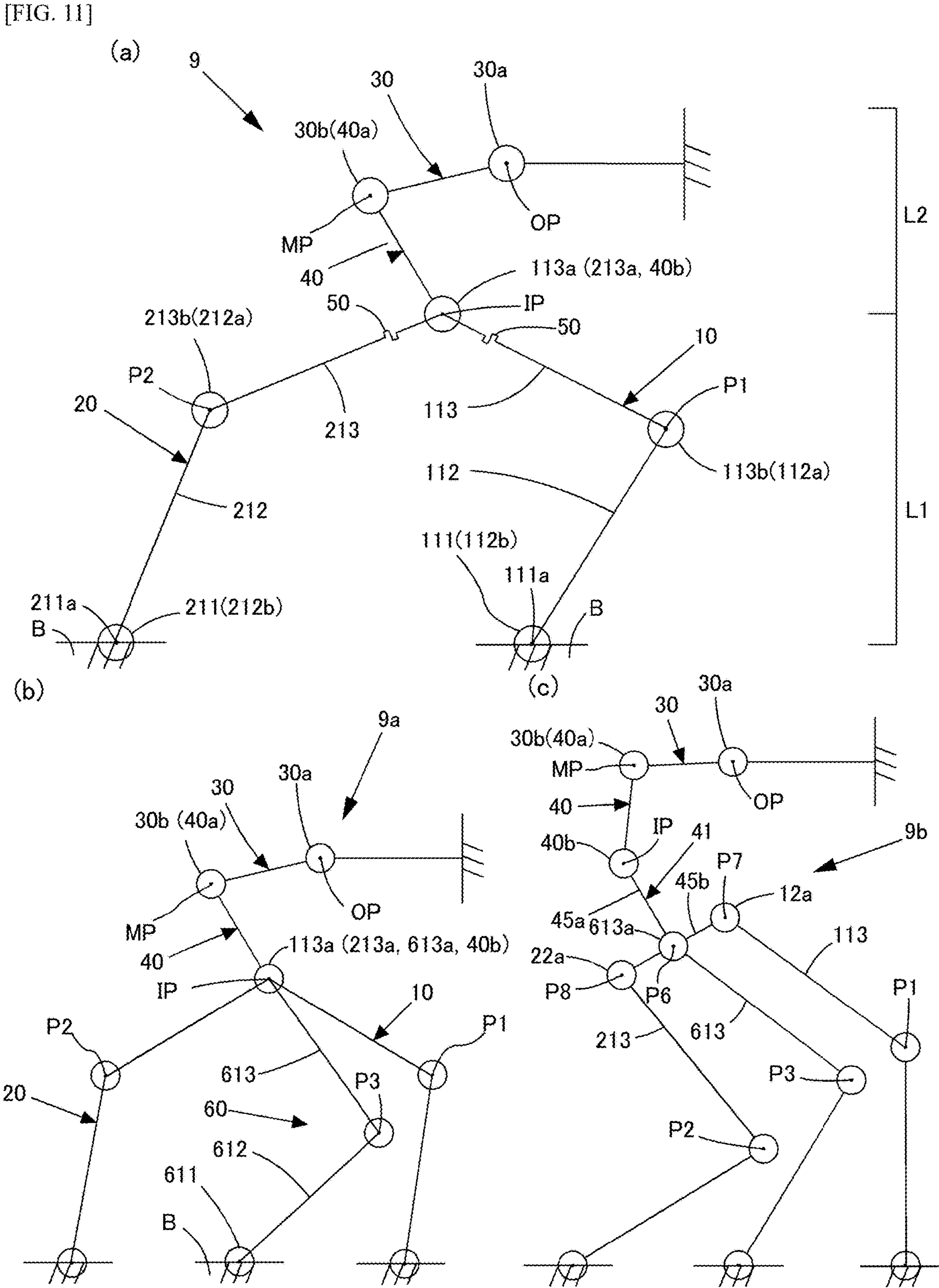

ROTARY ACTUATOR UNIT, AND JOINT UNIT FOR ROBOT OR HEAVY EQUIPMENT PROVIDED WITH SAME

TECHNICAL FIELD

This invention relates to a rotary actuator unit and a joint unit for robots or heavy machinery having the same.

BACKGROUND ART

Today, robot arms are used in a variety of fields, often to transport heavy loads. In addition, heavy machinery used for civil engineering and construction work, such as cranes and shovels, as well as elevating vehicles and special-purpose vehicles, also requires to drive the joints of working arms, such as robot.

It is known that it is advantageous to use continuously variable transmission as a joint for such a robot arm or other joint that is operated under load. Since a continuously variable transmission can change the reduction ratio steplessly, it enables continuous and smooth motion of the robot arm, both when a large force and a large speed are required.

For example, Patent Document 1 discloses a continuously variable transmission with a crank pivotally supported on a fixed pivot axis, a fulcrum supported on the crank in a sliding manner, and a drive unit that moves the fulcrum. In other words, the crank can be rotated by moving the fulcrum around the pivot axis of the crank by the drive unit. The reduction ratio can be varied by sliding the fulcrum on the crank and changing the distance between the pivot axis and the fulcrum. In this continuously variable transmission, the actuator for driving and the actuator for changing the reduction ratio are not separated as in a general continuously variable transmission, so two identical actuators can be used, and the driving force of each actuator can be distributed efficiently. Furthermore, the friction type CVT (Continuously Variable Transmission) used in automobiles relies on frictional force to transmit the driving force, but the mechanism of Patent Document 1 can transmit the driving force without relying on friction, so the transmission efficiency is high and the mechanism is highly durable.

PRIOR ART DOCUMENTS

Patent Document

[Patent Document 1] Patent Publication No. 2012-67809

[Non-Patent document 1] Hiroya Yamada, Development of a star-shaped crank-type continuously variable transmission with torque measurement function and its application to a quadruped walking robot, Abstract of the Robotics and Mechatronics Conference, 2012, 2A2-V05.

DISCLOSURE OF THE INVENTION

Problems to be Solved by the Invention

However, in the continuously variable transmission of Patent Document 1, since the center of gravity of the crank is not on the pivot axis of the crank and is eccentric, vibration is caused by the inertial force when the crank is rotated. A counterweight design could be applied to the crank, but it is difficult to design a counterweight that is perfectly balanced because the position of the center of gravity of the crank changes and the eccentric distance from the pivot axis also changes, as the fulcrum is moved on the crank.

In the crank and each link of the continuously variable transmission of Patent Document 1, the gravity of the crank and each link acts as a torque depending on the rotation angle when the crank is rotated around the pivot axis because of the difficulty in designing the counterweight of the crank as described above. In other words, an unintended torque is output to the pivot axis, which may affect the rotational motion of the crank. In particular, in the continuously variable transmission of Non-Patent Document 1, a force sensor (spring) is attached to the extendable link member to measure the torque, but even in that measurement, the effect of gravity on the crank and each link cannot be completely eliminated.

Furthermore, in the continuously variable transmission of the Patent Document 1, because the fulcrum must glide while constraining the fulcrum on the crank, and also transmit the drive torque to rotate the crank, the mechanism to achieve accurate gliding under load must be relatively complex.

The present invention was researched and developed in view of these circumstances, and is aimed at providing a rotary actuator unit using a simple link structure and a joint unit for robots and heavy machinery using the same.

Solution to the Problems

The rotary actuator unit of the invention characterized in that it comprises a first input part having a first actuator, a second input part having a second actuator, an output link member, an intermediate link member, an output side shaft fixed to a base, an intermediate shaft not fixed to the base, and an input side shaft not fixed to the base. The first input part and the second input part constitute at least a part of a link mechanism having two or more degrees of freedom. A tip of the output link member is rotatably supported around the output side shaft. A base end of the output link member and a tip of the intermediate link member are rotatably supported around the intermediate shaft. A base end of the intermediate link member and a tip of the link mechanism are rotatably supported around the input side shaft. A two-dimensional position of the input side shaft can be freely manipulated by controlling the first actuator and the second actuator to drive the link mechanism, and a rotation of the output link member around the output side shaft can be extracted as an output. Here, the term "fixed to the base" means that it is fixed to a base material such as a pedestal or base member of the rotary actuator unit, and is fixed in such a way that its two-dimensional position does not change even when each actuator is driven. On the other hand, the term "not fixed to the base" means that its 2-dimensional position changes when each actuator is driven. The term "the two-dimensional position of the input side shaft can be freely manipulated by controlling the first actuator and second actuator to drive the link mechanism" means that the two-dimensional position of the input side shaft can be arbitrarily manipulated within a predetermined range by operating the first actuator and second actuator, and that the two-dimensional position of the input side shaft can be fixed by stopping the first actuator and second actuator.

In the rotary actuator unit of the first aspect of the present invention, it is preferred that the first input part comprises a first linear actuator as the first actuator, a first shaft fixed to a mover of the first linear actuator, and a first input link member; the first linear actuator is fixed to the base; and a base end of the first input link member is rotatably supported around the first shaft. More, it is preferred that the second input part comprises a second linear actuator as the second actuator, a second shaft fixed to a mover of the second linear actuator, and a second input link member; the second linear actuator is fixed to the base; and a base end of the second input link member is rotatably supported around the second shaft. Further, it is preferred that the two-dimensional position of the input side shaft can be freely manipulated by controlling the first linear actuator and the second linear actuator.

In the rotary actuator unit of the first aspect of the present invention, it is preferred that a tip of the link mechanism is a tip of the first input link member and a tip of the second input link member, which are rotatably supported around the input side shaft.

In the rotary actuator unit of the first aspect of the present invention, where the tip of the first input link member and the tip of the second input link member constitute the tip of the link mechanism, it is preferred that the first input link member includes a first base end side link element and a first tip side link element; the first base end side link element has a first base end side counterweight portion such that its center of gravity is on the first shaft; and the first tip side link element has a first tip side counterweight portion such that its center of gravity is on the input side shaft. Also, it is preferred that the second input link member includes a second base end side link element and a second tip side link element; the second base end side link element has a second base end side counterweight portion such that its center of gravity is on the second shaft; and the second tip side link element has a second tip side counterweight portion such that its center of gravity is on the input side shaft. More, it is preferred that the intermediate link member has an intermediate counterweight portion such that a composite center of gravity of the first tip side link element, the second tip side link element, the input side shaft and the intermediate link member is on the intermediate shaft. Further, it is preferred that the output link member has an output side counterweight portion such that a composite center of gravity of the first tip side link element, the second tip side link element, the intermediate link member, and the output link member is on the output side shaft.

In the rotary actuator unit of the first aspect of the present invention, it is preferred that it further comprises a third input part having a third linear actuator, a third shaft fixed to a mover of the third linear actuator, and a third input link member; and the third input part constitutes at least a part of the link mechanism.

In the rotary actuator unit of the first aspect of the present invention, it is preferred that it is equipped with force sensors on the first input link member and the second input link member, respectively, to measure the translational force applied to the members, and the torque around the output side shaft is calculated from the respective measured values of the force sensors.

In the rotary actuator unit of the second aspect of the present invention, it is preferred that the first input part comprises a first shaft fixed to the base, a first linear actuator rotatably supported around the first shaft as the first actuator; the second input part comprises a second shaft fixed to the base, a second linear actuator rotatably supported around the second shaft as the second actuator; and the two-dimensional position of the input side shaft can be freely manipulated by controlling the first linear actuator and the second linear actuator.

In the rotary actuator unit of the third aspect of the present invention, it is preferred that the first input part comprises a first rotary motor as the first actuator, a first input first link member, a first shaft not fixed to the base, and a first input second link member; the first rotary motor is fixed to the base; a base end of the first input first link member is fixed to a movable shaft of the first rotary motor; and a tip of the first input first link member and a base end of the first input second link member are rotatably supported around the first shaft. Also, it is preferred that that the second input part comprises a second rotary motor as the second actuator, a second input first link member, a second shaft not fixed to the base, and a second input second link member; the second rotary motor is fixed to the base; a base end of the second input first link member is fixed to a movable shaft of the second rotary motor; and a tip of the second input first link member and a base end of the second input second link member are rotatably supported around the second shaft. Further, it is preferred that the two-dimensional position of the input side shaft can be freely manipulated by controlling the first rotary motor and second rotary motor.

In the rotary actuator unit of the second aspect of the present invention or in the rotary actuator unit of the third aspect of the present invention, it is preferred that tip of the link mechanism is the tip of the first input part and the tip of the second input part, which are rotatably supported around the input side shaft.

In the rotary actuator of the present invention, it is preferred that it further comprises a drive force transmission mechanism transmitting a rotation of the output link member, and a hollow shaft member that rotates in conjunction with the output link member by means of the drive force transmission mechanism.

In the rotary actuator unit of the present invention, it is preferred that it further comprises a driving force conversion mechanism that converts the rotation of the output link member into translational.

The rotary actuator of the other aspect of the invention characterized in that it comprises a first input part having a first linear actuator, a first link member in which a base end is rotatably connected to the first linear actuator around the first shaft; a second input part having a second linear actuator, a second link member in which a base end is rotatably connected to the second linear actuator around the second shaft; an output link member in which a tip is rotatably supported around an output side shaft; and an intermediate link member connecting the first input link member, the output link member, and the second input link member to the output link member; wherein a tip of the intermediate link member and a base end of the output link member are rotatably connected around the intermediate shaft; and wherein a two-dimensional position of the tip of the first input link member, the tip of the second input link member, and the base end of the intermediate link member can be freely manipulated by controlling the first linear actuator and the second linear actuator.

In the other aspect of rotary actuators of the present invention, it is preferred that a tip of the first input link member and a tip of the second input link member are rotatably connected around an input side shaft; and a base end of the intermediate link member is rotatably fixed around the input side shaft. In particular, it is preferred that the first input link member comprises a first base end side link element, a first tip side link element, a first base end side counterweight portion such that a gravity of a first base end side link element is on the first shaft, a first tip side counter weight portion such that a gravity of a first tip side link element is on the input side shaft. Also, it is preferred that the second input link member comprises a second base end side link element, a second tip side link element, a second base end side counterweight portion such that a gravity of a second base end side link element is on the second shaft, a second tip side counterweight portion such that a gravity of a second tip side link element is on the input side shaft. More, it is preferred that the intermediate link member has an intermediate counterweight portion such that a composite center of gravity of the first tip side link element, the second tip side link element, and the intermediate link member is on the intermediate shaft. Further, it is preferred that the output link member has an output side counterweight portion such that a composite center of gravity of the first tip side link element, the second tip side link element, the intermediate link member, and the output link member is on the output side shaft.

In the other aspect of rotary actuators of the present invention, it is preferred that it further comprises a third input part having a third linear actuator, and a third input link member in which a base end is rotatably fixed to the third linear actuator around the third shaft.

In the other aspect of rotary actuator of the present invention, it is preferred that it is equipped with force sensors on the members from the mover of the first linear actuator to the tip of the first input link member and from the mover of the second linear actuator to the tip of the second input link member, respectively, to measure the translational force applied to said members, and the torque applied by the output link member around the output side shaft is calculated from the respective measured values of the force sensors.

The joint unit for robots or heavy machinery of the present invention is characterized in that it includes the rotary actuator unit of the present invention. The joint unit for robots of the present invention is used, for example, in robot arms for industrial robots and humanoid robots. On the other hand, the joint unit for heavy machinery of the present invention is used for heavy equipment used in civil engineering and construction work, such as cranes and shovels, and for working arms of elevating vehicles.

Effect of the Invention

The rotary actuator unit of the present invention has the following effects.

The rotary actuator unit of the invention can infinitely rotate the output link member around the output side shaft by 360 degree or more, by properly controlling the first actuator (e.g., first linear actuator or first rotary motor) of the first input part and the second actuator (e.g., second linear actuator or second rotary motor) of the second input part, and its reduction ratio can also be changed steplessly (first effect).

The rotary actuator unit of this invention can transmit large torque because it does not use friction as a means of transmitting driving force, and it has high efficiency in transmitting driving force because of low friction loss (second effect).

The rotary actuator unit of the present invention does not require the use of gears as reduction means, which dramatically increases the shock resistance of the mechanism (third effect).

The rotary actuator unit of the present invention can efficiently distribute the driving force of the two actuators to the rotational force around the output side shaft of the output link member because the first actuator (e.g., first linear actuator or first rotary motor) and the second actuator (e.g. second linear actuator or first rotary motor), which are input sources, are not separated for driving and shifting, and both are responsible for driving and shifting (the fourth effect). In particular, efficiency can be further improved by using the same two actuators.

The rotary actuator unit of the present invention is composed of a link mechanism of the output side having a plurality of pivot axis and a plurality of links (output link member and intermediate link member) between the tip of the link mechanism of the input side and the output shaft (output side shaft), where the link mechanism of the input side comprises the first input part and the second input part, and have two or more degrees of freedom. Therefore, the sliding shaft which was essential in the Patent Document 1, can be eliminated, simplify parts, and can be structed to be resistant to contamination and foreign matter (fifth effect). In particular, by having the tip of the first input part (especially the tip of the first input link member), the tip of the second input part (especially the tip of the second input link member), and the base end of the intermediate link member be rotatably supported around the input side shaft, the parts can be further simplified.

The rotary actuator unit of the present invention can measure the torque of the output side shaft by a force sensor (load cell, etc.) that measures translational force by properly arranging the force sensors (sixth effect). For example, by installing each force sensor on a member of the first input link member and the second input link member, the wiring of the force sensor can be independent of the infinite rotational motion of the output link member.

The rotary actuator unit of present invention can easily design counterweights, because, as described above, it is composed solely of a link mechanism that pivots rather than glides except for the first actuator or the second actuator to be driven (seventh effect). And when counterweight design is properly applied, eccentricity of each link can be completely prevented. In other words, vibration caused by inertia force due to rotation of each eccentric link can be suppressed. Similarly, the possibility of unintended gravity-induced torque being output to the pivot axis, which could affect the rotational output of the rotary actuator unit of the invention can also be eliminated. Furthermore, if the force sensor is properly positioned, the effect of gravity can be completely eliminated from the force sensor measurement as well.

In the rotary actuator unit of the present invention, where the tip of the first input part (especially the tip of the first input link member), the tip of the second input part (especially the tip of the second input link member), and the base end of the intermediate link member are rotatably connected around the input side shaft, and aligning the input point (input side shaft) and the output shaft (output side shaft) in the same two-dimensional position by operating each actuator, in other word, placing the input side shaft and output side shaft on the same straight line, each actuator and output link member can be separated from each other to achieve a complete output shaft free rotation state (free rotation state of the output link member around the output side shaft) (eighth effect).

The rotary actuator unit of the present invention can make a complete no-load state of the force sensor (ninth effect), by appropriately providing the force sensor; fixing the tip of the first input part (especially the tip of the first input link member), the tip of the second input part (especially the tip of the second input link member) and the base end of the intermediate link member rotatably around the input side shaft; providing the counterweight design; then aligning the input point (input side shaft) and output shaft (output side shaft) by operating each actuator; and fixing each actuator in that position. In general, torque sensors and force sensors need to reset the zero point periodically (zero resetting) because temperature change and residual stress cause steady deviations in the measured values. Therefore, when the rotary actuator unit is built into an external device (e.g., a robot), the torque sensor or force sensor had to be separated or disassembled and zero reset to achieve a no-load state. However, this rotary actuator unit can create a complete no-load state of the force sensor only by operating each actuator without separating or disassembling it from the external equipment, and the force sensor can be easily zero reset. Therefore, even if a drift or other problem occurs in the force sensor, the force sensor can be periodically zero reset with little effort, enabling more accurate measurement.

BRIEF DESCRIPTION OF THE DRAWINGS

FIG. 1 Schematic diagram of the first embodiment of the rotary actuator unit of the invention.

FIG. 2*a* through FIG. 2*c* are schematic diagrams showing the driving state of the rotary actuator unit of FIG. 1.

FIG. 3*a* is a schematic diagram of the second embodiment of the rotary actuator unit of the invention, and FIG. 3*b* is a schematic diagram of its driving state.

FIG. 4*a* and FIG. 4*b* are schematic diagrams of the third and fourth embodiments of the rotary actuator unit of the invention.

FIG. 5*a* through FIG. 5*c* are schematic diagrams showing the fifth through seventh embodiments of the rotary actuator unit of the invention.

Figure 6:
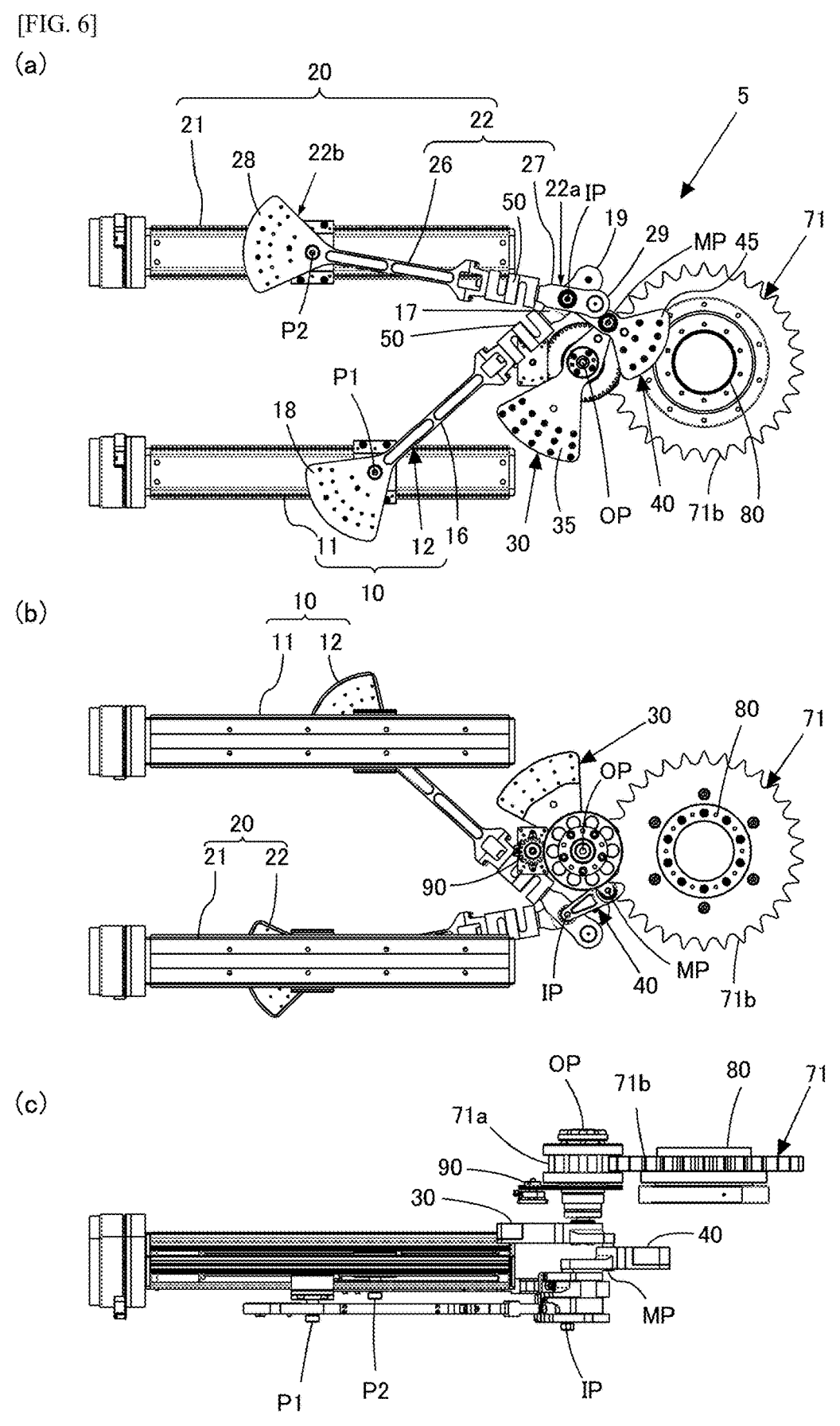

FIG. 6*a* through FIG. 6*c* are bottom, plan, and side views of the structure of the first prototype of the rotary actuator unit of the invention.

FIG. 7 The diagram shows the structure of the first prototype shown in FIG. 6*a*.

FIG. 8*a* through FIG. 8*c* are bottom, plan, and side views of the structure of the second prototype of the rotary actuator unit of the invention, and FIG. 8*d* is plan view of the third prototype of the rotary actuator unit of the invention.

FIG. 9*a* shows the diagram of the second prototype of FIG. 8*a*, FIG. 9*b* shows the diagram of the third prototype of FIG. 8*d*, and FIG. 9*c* and FIG. 9*d* show variations of the second and third prototypes, respectively.

FIG. 10*a* through FIG. 10*c* are schematic diagrams of the eighth through tenth embodiments of the rotary actuator unit of the invention.

FIG. 11*a* through FIG. 11*c* are schematic diagrams showing the eleventh through thirteenth embodiments of the rotary actuator unit of the invention.

MODES FOR CARRYING OUT THE INVENTION

Next, the first to third prototypes of the rotary actuator unit based on the first to thirteenth embodiments and embodiments of the rotary actuator unit of the present invention will be presented. The first to seventh embodiments (FIGS. 1 to 9) are embodiments of the rotary actuator unit of the first aspect of the present invention, the eighth to tenth embodiments (FIGS. 10*a* to 10*c*) are embodiments of the rotary actuator unit of the second aspect of the present invention, the eleventh to thirteenth embodiments (FIG. 11*a* to FIG. 11*c*) are embodiments of the rotary actuator unit of the third aspect of the present invention. However, the present invention is not limited to these embodiments.

The first embodiment of the rotary actuator unit is described below.

The rotary actuator unit 1 shown in FIG. 1 has a first input part 10, a second input part 20, an output link member 30, an intermediate link member 40, an output side shaft OP fixed to the base, an intermediate shaft MP not fixed to the base, and an input side shaft IP not fixed to the base. The first input part 10 and the second input part 20 constitute the link mechanism L1 of the input side with 2 degrees of freedom and the intermediate link member 40 and the output link member 30 constitute the link mechanism L2 of the output side. The tip of the input side link mechanism L1 (tip 12*a* of the first input link member and tip 22*a* of the second input link member) and the base end of the output side link mechanism L2 (base 40*b* of the intermediate link member 40) are rotatably supported around the input side shaft IP. The tip of the output side link mechanism L2 (tip 30*a* of the output link member 30) is rotatably supported around the output side shaft OP.

This rotary actuator unit 1 uses the linear motion of the first linear actuator 11 of the first input part 10 and the second linear actuator 21 of the second input part 20 as inputs; freely manipulates the two-dimensional position of the input side shaft IP which rotatably supports the base end 40*b* of the intermediate link member 40; operates the rotation of the output link member 30 around the output side shaft OP via the intermediate link member 40; and uses the rotational motion of the output link member 30 as the output.

In the rotary actuator unit 1 shown in FIG. 1, the first shaft P1, second shaft P2, output side shaft OP, input side shaft IP, and intermediate shaft MP are parallel and perpendicular to the paper surface in FIG. 1.

[First Input Part 10].

The first input part 10 has a first linear actuator 11, a first shaft P1, and a first input link member 12.

The first linear actuator 11 is fixed to the base B, such as a pedestal or base member of the rotary actuator unit 1. The first linear actuator 11, for example, is an existing one equipped with a ball screw, a nut, and a motor that rotates and drives the ball screw. However, the structure is not limited as long as the mover of the first linear actuator 11 can reciprocate on a single linear motion axis. For example, by using a shaft motor, the mechanism can be further simplified to reduce sliding parts and increase shock resistance.

The first shaft P1 is fixed to the mover of the first linear actuator 11.

The first input link member 12 has a base end 12*b* that is rotatably supported around the first shaft P1.

Because of this configuration, the tip 12*a* of the first input link member 12 can move freely within a predetermined range in a two-dimensional plane depending on the position of the mover (or base end 12*b*) of the first linear actuator and the angle between the first linear actuator 11 and the first input link member 12.

[Second Input Part 20].

The second input part 20 has a second linear actuator 21, a second shaft P2, and a second input link member 22.

The second linear actuator 21 is fixed to the base B, such as the pedestal or base member of the rotary actuator unit 1, so that it is parallel (parallel and in the same position in the linear motion direction) to the first linear actuator 11. However, the positions of the first linear actuator 11 and the second linear actuator 21 are not limited and may be arranged appropriately based on the application of the rotary actuator unit. For example, both actuators may be arranged to be parallel and shifted in the linear motion direction, or be arranged in a "inverse V" shape so that the distance shrinks toward the tip, or conversely arranged in a "V" shape so that the distance widens toward the tip, or arranged radially around the output side shaft OP. The structure of the second linear actuator 21 is not limited as long as the mover of the second linear actuator 21 can reciprocate on a single linear axis. However, by making the first linear actuator 11 and the second linear actuator 21 substantially the same structure, they can be driven efficiently as a whole.

The second shaft P2 is fixed to the mover of the second linear actuator 21.

The second input link member 22 has its base end 22*b* rotatably supported around the second shaft P2.

Because of this configuration, as with the first input link member 12, the tip 22*a* of the second input link member 22 can move freely within a predetermined range in a two-dimensional plane, depending on the position of the mover (or base end 22*b*) of the second linear actuator and the angle between the second linear actuator 21 and the second input link member 22.

The tip 12*a* of the first input link member 12 and the tip 22*a* of the second input link member 22 are rotatably fixed around the same axis around the input side shaft IP, so the input side shaft IP can move in two degrees of freedom on a plane parallel to the paper surface. In other words, the input side link mechanism L1 having the first input part 10, the second input part 20, and the input side shaft IP, is a direct operated fixed type five-bar link mechanism. The tip 12*a* of the first input link member 12 and the tip 22*a* of the second input link member 22 form the tips of the input side link mechanism L1.

Because of this configuration, the two-dimensional position of the input point (input side shaft IP) can be freely manipulated by appropriately controlling the first linear actuator 11 and the second linear actuator 21. Furthermore, when the first linear actuator 11 and the second linear actuator 21 are stopped, the degree of freedom is zero. In other words, by fixing the first linear actuator 11 and the second linear actuator 21, the position of the input point (input side shaft IP) can be completely fixed so that the position does not move.

In the rotary actuator unit 1 shown in FIG. 1, the first input part 10 and the second input part 20 constitute a direct operated fixed type five-bar link mechanism, in order to freely manipulate the two-dimensional position of the input point (input side prop axis IP). However, the mechanism is not limited to a direct operated fixed type five-bar link mechanism as long as the two-dimensional position of the input point (input side shaft IP) can be freely manipulated. For example, as described below, a linear operated type five-bar link mechanism (e.g., FIG. 10*a*) or a rotary type five-bar link mechanism (e.g., FIG. 11*a*) may be employed, or a mechanism other than the five-bar link mechanism such as the third and fourth embodiments (FIG. 4*a*, FIG. 4*b*), ninth and tenth embodiments (FIG. 10*b*, FIG. 10*c*), twelfth and first 3 embodiments (FIG. 11*b*, FIG. 11*c*), may be used.

[Output Link Member 30]

The tip 30*a* of the output link member 30 is rotatably supported around the output side shaft OP fixed to the base B, such as the pedestal or base member of the rotary actuator unit 1. The base end 30*b* of the output link member 30 is rotatably supported around the intermediate shaft MP and the tip 40*a* of the intermediate link member. In FIG. 1, the base end 30*b* of the output link member 30 and the tip 40*a* of the intermediate link member 40 overlap, with the supporting axis coinciding with the intermediate shaft MP.

[Intermediate Link Member 40.]

The intermediate link member 40 connects the first input link member 12 to the output link member 30 and the second input link member 22 to the output link member 30.

The tip 40*a* of the intermediate link member 40 is rotatably supported around the intermediate shaft MP as described above, together with the base end 30*b* of the output link member 30. On the other hand, the base end 40*b* of the intermediate link member 40 is rotatably supported around the input side shaft IP, together with the tip 12*a* of the first input link member and the tip 22*a* of the second input link member.

The length of the link of the intermediate link member 40 (distance between the input side shaft IP and the intermediate shaft MP) and the length of the link of the output link member 30 (distance between the output side shaft OP and the intermediate shaft MP) are the same length.

The operation of this rotary actuator unit 1 is described next.

As shown in FIG. 2*a*, this rotary actuator unit 1 moves the two-dimensional position of the input point (input side shaft IP) by driving the first linear actuator 11 and the second linear actuator 21, to rotate the output link member 30 around the output side shaft OP. In other words, by rotating the input side shaft IP around the output side shaft OP, the output link member 30 rotates around the output side shaft OP.

On the other hand, this rotary actuator unit 1 can vary the reduction ratio for the output link member 30 by controlling the distance X between the input side shaft IP and the output side shaft OP in the rotation plane. For example, as shown in FIG. 2*b*, by shortening the distance X between the input side shaft IP and the output side shaft OP, the reduction ratio can be reduced from the state of FIG. 2*a* and the rotation speed of the output link member 30 can be increased. In other words, the distance X between the input side shaft IP and the output side shaft OP and the rotational speed of the output link member 30 are generally inversely proportional.

Furthermore, the output link member 30 and intermediate link member 40 can be separated from the two actuators by aligning the rotation axes of the input side shaft IP and the output side shaft OP, as shown in FIG. 2*c*. This allows the output link member 30 and the intermediate link member 40 to achieve a free state, that is they can rotate freely around the output side shaft OP.

The rotary actuator unit 1 has the following effects.

The rotary actuator unit 1 can rotate the output link member 30 infinitely more than 360 degrees around the output side shaft OP and can also infinitely change its reduction ratio, by appropriately controlling the first linear actuator 11 of the first input part 10 and the second linear actuator 21 of the second input part 20.

The rotary actuator unit 1 can transmit a large torque because it does not use friction as a means of transmitting driving force. In addition, since there is no need to use gears between the input point (input side shaft IP) and the output axis (output side shaft OP) as a reduction means, the mechanism has excellent shock resistance.

The first linear actuator 11 and the second linear actuator 21 of the rotary actuator unit 1 are not separated for driving and speed change, but are both responsible for driving and speed change (reduction ratio change). So, the driving force of the two actuators can be efficiently distributed to the rotation around the output side shaft of the output link member 30. In particular, by using the same two actuators, the efficiency can be further improved.

The rotary actuator unit 1 is composed of an output side link mechanism L2 having three pivotal axis (input side shaft IP, intermediate shaft MP, and output side shaft OP) and two links (output link member 30 and intermediate link member 40) between the input point (input side shaft IP) and the output axis (output side shaft), which is operated by each linear actuator. Therefore, the rotary actuator unit 1 can eliminate the sliding shaft, which was essential in Patent Document 1, and can simplified the parts. Furthermore, since the output side link mechanism is composed only of a pivot axis, the counterweight design can be easily performed.

The rotary actuator unit 1 disconnects each linear actuator 11, 21 from the output link member 30 and intermediate link member 40 by aligning the input point (input side shaft IP) with the output axis (output side shaft OP), so that a free state in which the output link member 30 and the intermediate link member 40 rotate freely around the output axis (output side support axis OP) can be easily achieved.

Next, the second embodiment of the rotary actuator unit is described.

The rotary actuator unit 2 shown in FIG. 3*a* is the rotary actuator unit 1 shown in FIG. 1 with a force sensor 50 and a counterweight design so that the gravity of each link member is not applied to the force sensor 50 and the center of gravity of each link member is aligned with the support axis. In other words, the rotary actuator unit 2 has a first input part 10, a second input part 20, an output link member 30, an intermediate link member 40, an output side shaft OP, an intermediate shaft MP, and an input side shaft IP, and is substantially the same as the rotary actuator unit 1 in FIG. 1, except for the force sensor 50 and counterweight design. And it shares the same structure with each character or numeral of the rotary actuator unit 1 shown in FIG. 1.

The force sensor 50 is a force sensor that measures translational force. For example, a load cell can be cited. When the force sensor 50 is installed on the first input link member 12 and the second input link member 22, respectively, as in this embodiment, the force sensor 50 is suitably a uniaxial load cell that measures the translational force of tension and compression of each link member. The location of the force sensor 50 is not limited as long as it is between the mover (first shaft P1) of the linear actuator 11 and the input side shaft IP, and between the mover (second shaft P2) of the linear actuator 21 and the input side shaft IP of the linear actuator 21, respectively. However, it is particularly preferable to install the force sensors as close as possible to the input side shaft IP of each first input link member 12 and the second input link member 22. This allows the wiring of the force sensor 50 to be unobstructed even when the output link member 30 is rotated infinitely; the torque can be measured relatively accurately; and this is also advantageous for the counterweight design.

It is preferable to calculate the torque around the output side shaft OP from each measurement of the force sensor 50 provided in this way.

The first input link member 12 comprises a first base end side link element 16 from the base end 12*b* to the measurement reference plane of the force sensor 50 and a first tip side link element 17 from said measurement reference plane to the tip 12*a*. The first base end side link element 16 and the first tip side link element 17 move in unison.

The first base end side link element 16 of the first input link member 12 has a first base end side counterweight portion 18 at the base end 12*b* so that its center of gravity is on the first shaft P1. The first tip side link element 17 of the first input link member 12 has a first tip side counterweight portion 19 at the tip 12*a* so that its center of gravity is on the input side shaft IP.

The second input link member 22 has a second base end side link element 26 from the base end 22*b* to the measurement reference plane of the force sensor 50 and a second tip side link element 27 from said measurement reference plane to the tip 22*a*. The second base end link element 26 and the second tip link element 27 move in unison.

The second base side link element 26 of the second input link member 22 has a second base end side counterweight portion 28 at the base end 22*b* so that its center of gravity is on the second shaft P2. The second tip side link element 27 of the second input link member 22 has a second tip side counterweight portion 29 at the tip 22*a* so that its center of gravity is on the input side shaft IP.

The intermediate link member 40 has an intermediate counterweight portion 45 at the tip 40*a* so that the combined center of gravity of the first tip side link element 17, the second tip side link element 27, the input side shaft IP and the intermediate link member 40 is on the intermediate shaft MP.

The output link member 30 has an output side counterweight portion 35 at the tip 30*a* so that the composite center of gravity of the first tip side link element 17, second tip side link element 27, input side shaft IP, intermediate link member 40 and output link member 30 is on the output side shaft OP.

This rotary actuator unit 2 has the same effect as the rotary actuator unit 1 shown in FIG. 1, that is it does not use friction as a driving force transmission means, the output link member 30 can be rotated indefinitely 360 degrees or more around the output side shaft OP, and it can also change its reduction ratio steplessly.

In particular, the rotary actuator unit 2 has a counterweight design so that the center of gravity of each link is aligned with the axis of rotation and the gravity of each link member is not applied to the force sensor 50, so that link eccentricity does not occur. In other words, vibration due to link eccentricity can be minimized. Furthermore, the force sensors 50 installed in the first input link member 11 and the second input link member 12 can measure the torque around the output side shaft OP after completely eliminating the effect of gravity on each link.

As shown in FIG. 3*b*, a complete no-load state of the force sensor 50 can be created by operating each linear actuator so that the input side shaft IP and the output side shaft OP of the rotary actuator unit 2 overlap, and fixing each linear actuator at that position. In other words, the rotary actuator unit 2 can easily reset the zero point of the force sensor 50 without disassembling it, even when it is assembled into a robot arm or the like.

The third embodiment of the rotary actuator unit of the present invention is described next.

The rotary actuator unit 3 of FIG. 4*a* further has a third input part 60 equipped with a third linear actuator 61, a third shaft P3, and a third input link member 62. The third linear actuator 61 is fixed to the base B, such as a pedestal or base member of the rotary actuator unit 3. The third shaft P3 is fixed to the mover of the third linear actuator 61. The base end 62*b* of the third input link member 62 is rotatably supported around the third shaft P3, and the tip 62*a* is rotatably supported around the input side shaft IP. The third input part 60 constitutes an input side link mechanism, together with the first input part 10 and the second input part 20. The first linear actuator 11 of the first input part 10, the second linear actuator 21 of the second input part 20, and the third linear actuator 61 of the third input part 60 are operated to manipulate the two-dimensional position of the input side shaft IP and rotate the output link member 30 around the output side shaft OP.

In FIG. 4*a*, three input parts are shown, but there can be four or more. By increasing the number of inputs, the maximum output can be improved. Also, although three linear actuators are shown here in parallel, their arrangement is not limited. For example, they may be arranged radially around the third shaft P3.

This rotary actuator unit 3 has the same effect as the rotary actuator unit 1 in FIG. 1. It can also give the same effect as the rotary actuator unit 2 in FIG. 2 by appropriately designing the counterweight.

The fourth embodiment of the rotary actuator unit of the present invention is described next.

The rotary actuator unit 4 of FIG. 4*b* has a second intermediate link member 41 between the intermediate link member 40 and the first input link member 12 of the first input part 10 and the second input link member 22 of the second input part 20, and a third input part 60 that controls the orientation of the second intermediate link member 41.

The third input part 60 has a third linear actuator 61 fixed to the base, a third shaft P3 fixed to the mover of the third linear actuator 61, and a third input link member 62 whose base end 62*b* is rotatably supported around the third shaft P3. However, the third input part 60 is not limited as long as it is equipped with a third actuator and one degree of freedom of the tip of the third input part 60 can be controlled by the third actuator. For example, the third input part 60 of the rotary actuator 8*b* shown in FIG. 10*c*, the third input part 60 of the rotary actuator 9*b* shown in FIG. 11*c*, and etc. may be used.

The second intermediate link member 41 has a base end 47 that intersects the link body 46 at a predetermined angle (here, perpendicular) and has an overall T-shape. The tip 46*a* of the link body 46 is rotatably supported around the input side shaft IP together with the base end 40*b* of the intermediate link member 40. The base end 47 of the intermediate link member has a seventh shaft P7 that rotatably supports the tip 12*a* of the first input link member, an eighth shaft P8 that rotatably supports the tip 22*a* of the second input link member, and a ninth shaft P9 that rotatably supports the tip 62*a* of the third input link member. Therefore, the tip of the input side link mechanism of the rotary actuator unit 4 is the tip 46*a* of the link body 46 of the second intermediate link member 41.

The rotary actuator unit 4 configured in this way can determine the positional relationship of the first shaft P1 and second shaft P2 by appropriately controlling the first linear actuator 11 and the second linear actuator 21, and also determine the posture (angle) of the second intermediate link member 41 by appropriately controlling the third liner actuator 61 to manipulate the two dimensional position of the input side shaft IP, and properly rotates the output link member 30 around the output side shaft OP. In particular, the output can be increased because the number of actuators increases, and moreover, and moreover, since the input side shaft IP, seventh shaft P7, eighth shaft P8, and ninth shaft P9 can be separated from each other, the machine design can be provided with more leeway.

This rotary actuator unit 4 has one more link than the rotary actuator unit 1 in FIG. 1. Therefore, the control operations of the first linear actuator 11, second linear actuator 21, and third linear actuator 61 to properly rotate the output link member 30 around the output side shaft OP becomes more complex. However, other than that, the effect is substantially the same as that of the rotary actuator unit 1 shown in FIG. 1.

Furthermore, since this rotary actuator unit 4 is composed of only link mechanisms that pivot rather than glide, except for the linear actuators that drive them. Therefore, by appropriately attaching force sensors to the first input link member 12, second input link member 22, and third input link member 62, and by appropriately designing the counterweights so that the gravity of each link member is not applied to these force sensors, the same effect as in the rotary actuator unit 2 in FIG. 2 can be achieved.

Although a T-shaped second intermediate link member 41 is introduced here, its shape is not limited. For example, a cross-shaped one may be used.

The rotary actuator units 1*a* and 1*b* shown in FIG. 5*a* and FIG. 5*b*, are the fifth and sixth embodiments of the rotary actuator unit, respectively.

The rotary actuator unit 1A of FIG. 5*a* is a rotary actuator unit 1 of FIG. 1, in which the drive force transmission mechanism 70 which transmit the rotation of the output link member around its output side shaft, and the hollow shaft member 80 which rotates in conjunction with the output link member 30 by drive force transmission mechanism 70, are further provided on the output axis (output side shaft OP) of the output link member 30.

The drive force transmission mechanism 70 has a first pulley 70*a* that transmits the rotation of the output link member 30, a second pulley 70*b*, and a belt 70*c* that transmits the rotation of the first pulley 70*a* to the second pulley 70*b*.

However, as long as the rotational motion can be transmitted, the mechanism is not limited to pulleys in particular, but can include any known mechanism. For example, the drive force transmission mechanism 71 of the rotary actuator unit 1B shown in FIG. 5*b* is equipped with a first gear 71*a* that transmits rotation of the output link member 30 and a second gear 71*b* that meshes with the first gear 71*a*.

By offsetting the final output axis of the rotary actuator unit from the output side shaft OP to the hollow shaft member 80 using the drive force transmission mechanisms 70, 71, for example, wiring across the joint can be passed through this hollow shaft member 80.

The rotary actuator unit 1C of FIG. 5*c* is the seventh embodiment of the rotary actuator unit.

The rotary actuator unit 1C of FIG. 5*c* is equipped with a drive force conversion mechanism 72 that converts the rotation of the output link member 30 of the actuator unit 1 of FIG. 1 around its output axis (output side shaft OP) into linear motion. This drive force conversion mechanism 72 has a pinion 72*a* that transmits the rotation of the output link member 30 and a rack 72*b* that converts the rotation of the pinion 72*a* into linear motion.

The rotary actuator unit 1C of FIG. 5*c* uses a drive force conversion mechanism 72 which comprises a pinion and rack, but it is not particularly limited to a pinion and rack; and any known drive force conversion mechanism that converts rotational motion into linear motion can be applied.

Figure 10:
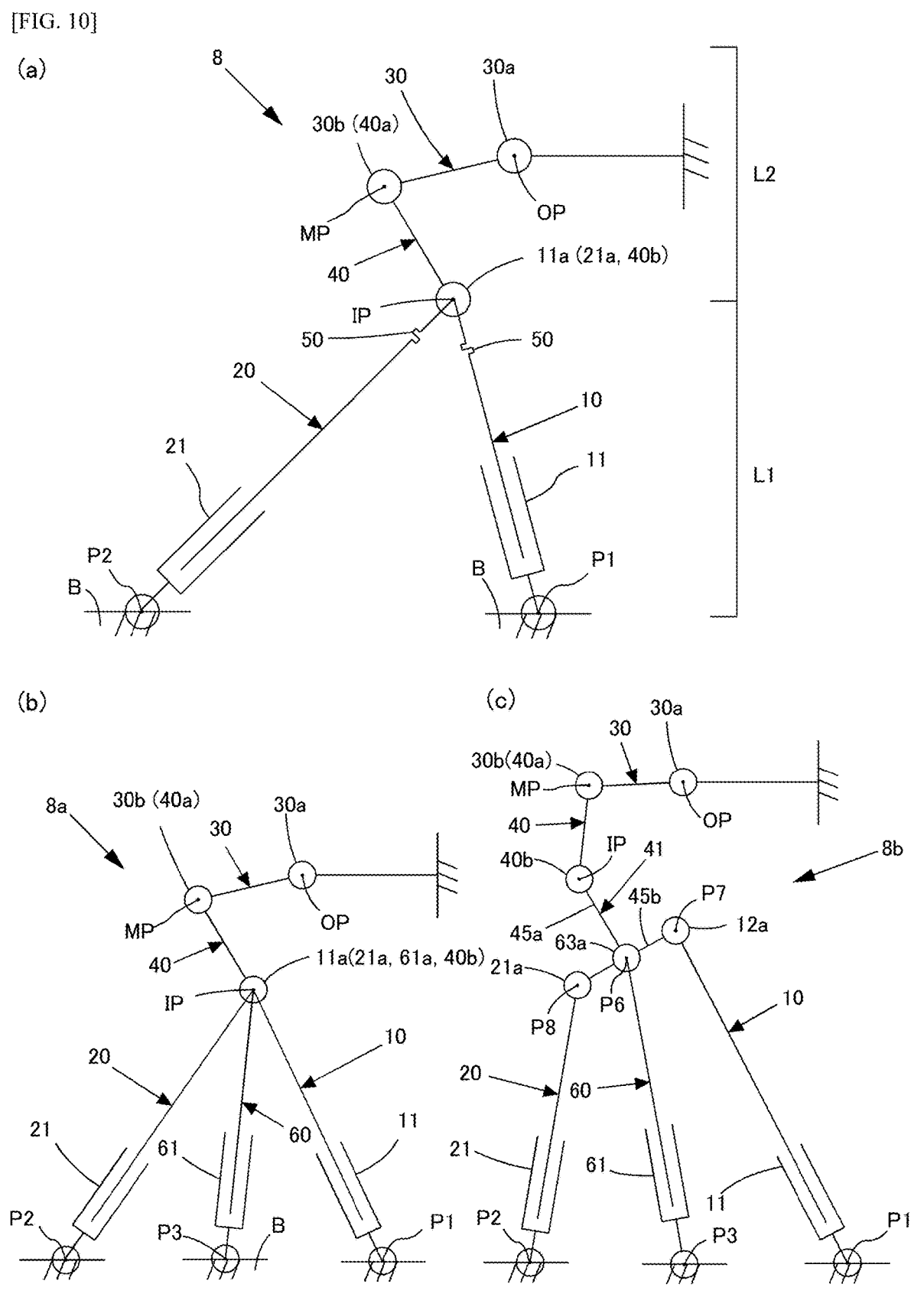

In the rotary actuator units 1A to 1C of FIGS. 5*a* to 5*c*, the driving force transmission mechanisms 70, 71 and the driving force conversion mechanism 72 are attached to the rotary actuator unit 1 of FIG. 1, but they may be attached to other rotary actuator units 2, 3, and 4 shown in FIGS. 3 and 4 or to the rotary actuators 8*a*-8*c*, and 9*a*-9*c* shown in FIGS. 10 and 11, respectively.

The rotary actuator unit 5 of FIGS. 6 and 7 shows a first prototype of the rotary actuator unit 2 of FIG. 2 with the final output axis offset to the hollow shaft member 80 via the drive force transmission mechanism 71. In other words, it has a first input part 10, a second input part 20, an output link member 30, an intermediate link member 40, a force sensor 50, an output side shaft OP, an intermediate shaft MP, an input side shaft IP, a drive force transmission mechanism 71, and a hollow shaft member 80 and it is applied with counterweight design. The character or numeral 90 is an encoder for measuring the displacement angle of the output axis (output side shaft OP). The other characters or numerals are common to the structure of the rotary actuator unit 2 of FIG. 2. Although the rotation status of the output axis (output link member) can be monitored by the actuator in the input part. However, by installing an encoder on the output axis as well, the rotation status of the output shaft can continue to be monitored even when the output side shaft OP is aligned with the input side shaft IP, that is the output shaft is disconnected from the linear actuator and the output shaft (output side shaft OP) is left idling in a free state.

The structure of the first linear actuator 11 and the second linear actuator 21 is not particularly limited, and mentioned that the existing example with a ball screw, a nut, and a motor that rotates and drives the ball screw can be used. However, instead of a ball screw with low friction and good transmission efficiency, a sliding screw with high friction and poor transmission efficiency may be selected. In this case, the linear actuator will have a so-called self-locking function, and the rotary actuator unit will not reverse drive unless the driving force is actively applied (except when the output axis (output side shaft OP) is in completely free rotation state by aligning the input point (input side shaft IP) with the output axis (output side shaft OP). This means that when a sliding screw is used, a locked state of the output shaft can be achieved except in the free rotation state of the output axis.

The same locking function can, of course, be achieved by installing a braking mechanism such as an (electromagnetic) brake on the output axis (output side shaft OP), a linear actuator such as a ball screw, or a motor that drives the ball screw or the like. In this case, an extra brake, etc., must be installed. But, for example, the output axis can be locked while using a ball screw with good transmission efficiency.

The rotary actuator unit 6 of FIG. 8*a* through FIG. 8*c* and FIG. 9*a* shows a second prototype example of the rotary actuator unit 2 of FIG. 2 with a driving force conversion mechanism 72 attached. In other words, the rotation of the output axis of the rotary actuator unit 2 is converted into linear motion. The rotary actuator unit 6 is also equipped with a brake mechanism 95 that brakes the rotation of the output axis (output side shaft OP), as described above. The other characters or numerals share the same structure with the rotary actuator unit 2 in FIG. 2.

By providing a brake mechanism 95 on the output axis, a lock function can be given to the output axis regardless of the state of the output axis. In particular, the lock function can be given to the output axis even when the output side shaft OP and the input side shaft IP are stacked state. That is, with the output shaft locked and disconnecting the output shaft from the first and second actuators 11 and 21 by aligning the output shaft and input point, a complete no-load state of the force sensor can be created, and the force sensor zero resetting can be performed. Also, the force sensor zero resetting can be performed with the output axis not free from external force, and with the drive force conversion mechanism 72 and the external mechanism connected to the drive force conversion mechanism 72.

The brake mechanism 95 of the rotary actuator unit 6 is not particularly limited, but an electromagnetic brake, for example, is preferred. The brake mechanism 95 may be attached to other rotary actuator units.

The brake mechanism 95 of the rotary actuator unit 6 is provided on the output axis (output side shaft OP), but may be provided outside the output axis, such as in the drive force conversion mechanism 72.

The rotary actuator unit 6 has the rack 72*b* of the driving force conversion mechanism 72 to move in a straight line parallel to the first linear actuator 11 of the first input part 10 and the second linear actuator 21 of the second input part 20. However, the rack 72*b* can be made to move straight in any direction by engaging the rack 72*b* with pinion 72*a* at any angle around the pinion 72*a*. For example, the rack 72*b* can be installed at a 90-degree angle to the first linear actuator 11 and the second linear actuator 21, as in the rotary actuator unit 6A of FIG. 9*c*.

The rotary actuator unit 7 of FIG. 8*d* and FIG. 9*b* is equipped with a drive force conversion mechanism 73. The drive force conversion mechanism 73 has a pinion 73*a*, a first rack 73*b*, and a second rack 73*c*, with the first rack 73*b* and the second rack 73*c* relative to each other across the pinion 73*a*. In this case, when the pinion 73*a* rotates in one direction, the first rack 73*b* and the second rack 73*c* move straight in opposite directions. However, the first rack 73*b* and the second rack 73*c* may be stacked, for example, in the axial direction. In this case, the two racks travel in the same direction. The orientation of the driving force conversion mechanism 73 with respect to the rotary actuator unit may be changed, as in the rotary actuator unit 7A of FIG. 9*d*.

Next, the second aspect of rotary actuator unit (the eighth and tenth embodiments) of the invention is described.

The rotary actuator unit 8 (eighth embodiment) shown in FIG. 10*a* has a first input part 10, a second input part 20, an output link member 30, an intermediate link member 40, an output side shaft OP fixed to the base, an intermediate shaft MP not fixed to the base, and an input side shaft IP not fixed to the base. The first input part 10 has a first shaft P1 fixed to the base B and a first linear actuator 11 rotatably supported around the first shaft P1. The second input part 20 has a second shaft P2 fixed to the base B and a second linear actuator 21 rotatably supported around the second shaft P2. The mover 11*a* of the first linear actuator 11 and the mover 21*a* of the second linear actuator 21, together with the base end 40*b* of the intermediate link member 40, are rotatably supported around the input side shaft IP. In other words, the first input part 10 and the second input part 20 constitute the input side direct operated type five-bar link mechanism L1. The output side link mechanism L2 is substantially the same as the rotary actuator 1 in FIG. 1. The mover 11*a* of the first linear actuator 11 (the tip of the first input part) and the mover 21*a* of the second linear actuator 21 (the tip of the second input part) form the tips of direct operated type five-bar link mechanism on the input side. Thus, the intermediate link member 40 connects the mover 11*a* of the first linear actuator 11 with the output link member 30, and the mover 21*a* of the second linear actuator 21 with the output link member 30.

Therefore, by controlling the first linear actuator 11 and the second linear actuator 21, the two-dimensional position of the input side shaft IP can be freely manipulated to rotate the output link member 30 around the output side shaft OP.

The force sensor 50 is installed on the stem of the first linear actuator 11 and the second linear actuator 21, and it is preferred to be closer to the input side shaft IP, although it is not particularly limited.

This rotary actuator 8 does not have a counterweight design. However, it is complicated but theoretically possible to provide counterweights that are linked to the operation of linear actuator, for example, at the base and tip (mover) of each linear actuator, at the base 40*b* and tip 40*a* of the intermediate link member, and at the base 30*b* and tip 30*a* of the output link member, respectively. This appropriate counterweight design would prevent eccentricity of each link.

The rotary actuator unit 8*a* (ninth embodiment) of FIG. 10*b* is the rotary actuator unit 8 of FIG. 10*a* with a third input part 60. The third input unit 60 has a third linear actuator 61 that is rotatably supported around a third shaft P3 fixed to the base B. The mover 61*a* of the third linear actuator 61 is rotatably supported around the input side shaft IP together with the base end 40*b* of the intermediate link member.

The rotary actuator unit 8*b* (10th embodiment) of FIG. 10*c* has a second intermediate link member 41 between the intermediate link member 40 of the rotary actuator unit 8 of FIG. 10*a* and the linear actuators (first linear actuator 11 and the second linear actuator 21); and a third input part 60 controlling the posture of the intermediate link member 41. The third input part 60 has a third support shaft P3 fixed to the base B and a third linear actuator 61 rotatably supported around the third shaft P3. The second intermediate link member 41 is substantially the same as the second intermediate link member 41 of the rotary actuator unit 4 of FIG. 4*b*. The third input unit 60 is not limited as long as it is equipped with a third actuator (rotary motor or linear actuator), and the two-dimensional position of the tip of the third input unit 60 can be controlled by the third actuator. For example, the third input unit 60 of the rotary actuator 4 of FIG. 4*b* or the third input 60 of rotary actuator 9*b*, of FIG. 11*c*, may be used.

Next, the third aspect of rotary actuator unit (the eleventh to thirteenth embodiments) is described.

The rotary actuator unit 9 (11th embodiment) of FIG. 11*a* has a first input part 10, a second input part 20, an output link member 30, an intermediate link member 40, an output side shaft OP fixed to the base, an intermediate shaft MP not fixed to the base, and an input side shaft IP not fixed to the base. The first input part 10 has a first motor 111, a first input first link member 112, a first shaft P1 not fixed to the base, and a first input second link member 113. The first rotary motor 111 is fixed to the base B. The base 112*b* of the first input first link member 112 is fixed to the movable shaft 111*a* of the first motor 111, and the tip 112*a* of the first input first link member 112 and the base 113*b* of the first input second link member 113 are rotatably supported around the first shaft P1. The second input part 20 has a second motor 211, a second input first link member 212, a second shaft P2 not fixed to the base, and a second input second link member 213. The second motor 211 is fixed to the base B. The base end 212*b* of the second input first link member 212 is fixed to the movable shaft 211*a* of the second motor 211, and the tip 212*a* of the second input first link member 212 and the base end 213*b* of the second input second link member 213 are rotatably supported around the second shaft P2. The tip 113*a* of the first input second link member 113 and the tip 213*a* of the second input second link member 213, together with the base end 40*b* of the intermediate link member 40, are rotatably supported around the input side shaft IP. In other words, the first input part 10 and the second input part 20 constitute the input side rotary type five-bar link mechanism L1. The tip 113*a* of the first input second link member 113 and the tip 213*a* of the second input second link member 213 forms the tips of the rotary type five-bar link mechanism of the input side. Thus, the intermediate link member 40 connects the first input second link member 113 to the output link member 30 and the second input second link member 213 to the output link member 30. The link mechanism L2 on the output side is substantially the same as the link mechanism L2 of the rotary actuator unit 1 of FIG. 1.

Therefore, by controlling the first rotary motor 111 and the second rotary motor 211, the two-dimensional position of the input side shaft IP can be freely manipulated to rotate the output link member 30 around the output side shaft OP.

The force sensors 50 are provided on the first input second link member 113 and the second input second link member 213, and although this is not particularly limited but it is preferable that they are provided closer to the input side shaft IP.

This rotary actuator 9 does not have a counterweight design. However, by applying an appropriate counterweight design, the eccentricity of each link can be avoided.

The rotary actuator unit 9*a* (12th embodiment) shown in FIG. 11*b* is the rotary actuator unit 9 of FIG. 11*a* with the third input part 60. The third input part 60 has a third motor 611 fixed to the base B; a third input first link member 612 whose base end 612*b* is fixed to the pivot axis of the third motor 611; and a third input second link member 613 whose base end is connected to the tip of the third input first link member 612 rotatably around a third shaft P3. Further, the tip 613*a* of the third input second link member 613 is rotatably supported around the input side shaft IP.

The rotary actuator unit 9*b* (13th embodiment) of FIG. 11*c* has a second intermediate link member 41 which is provided between the intermediate link member 40 of the rotary actuator unit 9 of FIG. 11 and the first input second link member 113 and between the intermediate link member 40 of the rotary actuator unit 9 of FIG. 11 and the second input second link member 213; and a third input part 60 controlling the posture of the second intermediate link member 41. The third input part 60 has a third motor 611 fixed to the base, a first input first link member 612, a third shaft P3 not fixed to the base, and a first input second link member 613. The base end of the third input first link member 612 is fixed to the movable shaft of the third motor 611, and the tip of the third input first link member 612 and the base end of the third input second link member 613 are rotatably supported around the third shaft P3. The intermediate link member 41 is substantially the same as the second intermediate link member 41 and the third input 60 of the rotary actuator unit 4 of FIG. 4*b*. The tip 613*a* of the third input second link member 613 is rotatably supported around the ninth shaft P9. The third input unit 60 is not limited as long as it is equipped with a third actuator (rotary motor or linear actuator), and the two-dimensional position of the tip of the third input unit 60 can be controlled by the third actuator. For example, the third input unit 60 of the rotary actuator 4 of FIG. 4*b* or the third input 60 of rotary actuator, may be used.

DESCRIPTION OF THE REFERENCE CHARACTERS

1, 1A, 1B, 1C rotary actuator unit; 2, 3, 4, 5 rotary actuator unit; 6, 6A, 7, 7A, 8*a*, 8*b*, 8*c*, 9*a*, 9*b*, 9*c* rotary actuator unit; 10 first input part; 11 first linear actuator; 11*a* mover; 12 first input link member; 12*a* Tip; 12*b* Base end; 16 first base end side link element; 17 first tip side link element; 18 first base end side counterweight portion; 19 first tip side counterweight portion; 20 second input part; 21 second linear actuator; 21*a* mover; 22 second input link member; 22*a* tip; 22*b* base end; 26 second base end side link element; 27 second tip side link element; 28 second base end side counterweight portion; 29 second tip side counterweight portion; 30 output link member; 30*a* tip; 30*b* base end; 35 output side counterweight portion; 40 intermediate link member; 40*a* tip; 40*b* base end; 41 second intermediate link member 45 Intermediate counterweight portion; 46 Link body; 46*a* Tip; 47 Base end; 50 Force sensor; 60 Third input part; 61 Third linear actuator; 62 Third input link member; 62*a* Tip; 62*b* Base end; 70 Drive force transmission mechanism; 70*a* First pulley; 70*b* Second pulley; 70*c* Belt; 71 drive force transmission mechanism; 71*a* first gear; 71*b* second gear; 72 drive force transmission mechanism; 72*a* pinion; 72*b* rack; 73 drive force transmission mechanism; 73*a* pinion; 73*b* first rack; 73*c* second rack; 80 hollow shaft member; 90 encoder; 95 brake mechanism; 111 first rotation motor; 111*a* movable shaft; 112 112 first input first link member; 112*a* Tip; 112*b* Base end; 113 first input second link member; 113*a* Tip; 113*b* Base end; 211 second rotary motor; 211*a* Movable shaft; 212 second input first link member; 212*a* Tip; 212*b* Base end; 213 second input second link member; 213*a* Tip; 213*b* Base end; 611 Third rotary motor; 612 Third input first link member; 613 Third input second link member; 613*a* Tip; B Base; L1 Input side link mechanism; L2 Output side link mechanism; OP Output shaft; IP Input shaft; MP Intermediate shaft; P1 First shaft; P2 Second shaft; P3 Third shaft; P7 seventh shaft; P8 eighth shaft; P9 ninth shaft.

The invention claimed is:

1. A rotary actuator unit comprising;

a first input part having a first actuator, a second input part having a second actuator, an output link member, an intermediate link member, an output side shaft fixed to a base, an intermediate shaft not fixed to the base, and an input side shaft not fixed to the base, wherein the first input part and the second input part constitute at least a part of a link mechanism having two or more degrees of freedom;

a tip of the output link member is rotatably supported around the output side shaft;

a base end of the output link member and a tip of the intermediate link member are rotatably supported around the intermediate shaft;

a base end of the intermediate link member and a tip of the link mechanism are rotatably supported around the input side shaft; and a two-dimensional position of the input side shaft can be freely manipulated by controlling the first actuator and the second actuator to drive the link mechanism, and a rotation of the output link member around the output side shaft can be extracted as an output.

2. The rotary actuator unit according to claim 1, wherein, the first input part has a first linear actuator as the first actuator, a first shaft fixed to a mover of the first linear actuator, and a first input link member; the first linear actuator is fixed to the base and a base end of the first input link member is rotatably supported around the first shaft;

the second input part has a second linear actuator as the second actuator, a second shaft fixed to a mover of the second linear actuator, and a second input link member; the second linear actuator is fixed to the base; and a base end of the second input link member is rotatably supported around the second shaft; and the two-dimensional position of the input side shaft can be freely manipulated by controlling the first linear actuator and the second linear actuator.

3. The rotary actuator unit according to claim 2, wherein a tip of the link mechanism is a tip of the first input link member and a tip of the second input link member, which are rotatably supported around the input side shaft.

4. The rotary actuator unit according to claim 3, wherein, the first input link member has a first base end side link element and a first tip side link element, the first base end side link element has a first base end side counterweight portion such that its center of gravity is on the first shaft, and the first tip side link element has a first tip side counterweight portion such that its center of gravity is on the input side shaft;

the second input link member has a second base end side link element and a second tip side link element, the second base end side link element has a second base end side counterweight portion such that its center of gravity is on the second shaft, and the second tip side link element has a second tip end side counterweight portion such that its center of gravity is on the input side shaft;

the intermediate link member has an intermediate counterweight portion such that a composite center of gravity of the first tip side link element, the second tip side link element, the input side shaft and the intermediate link member is on the intermediate shaft; and the output link member has an output side counterweight portion such that a composite center of gravity of the first tip side link element, the second tip side link element, the input side shaft, the intermediate link member, the intermediate shaft and the output link member is on the output side shaft.

5. The rotary actuator unit according to claim 2, further comprising, a third input section having a third linear actuator, a third shaft fixed to a mover of the third linear actuator, and a third input link member, wherein the third input section constitutes at least a part of the link mechanism.

6. The rotary actuator unit according to claim 2, wherein each of the first input link member and the second input link member is equipped with a force sensor that measures a translational force applied to the first input link member and the second input link member, and a torque around the output side shaft is calculated from each measured value of the force sensor.

7. The rotary actuator unit according to claim 1, wherein the first input section has a first shaft fixed to the base, a first linear actuator rotatably supported around the first shaft as the first actuator;

the second input section has a second shaft fixed to the base, a second linear actuator rotatably supported around the second shaft as the second actuator; and the two-dimensional position of the input side shaft can be freely manipulated by controlling the first linear actuator and the second linear actuator.

8. The rotary actuator unit according to claim 1, wherein, the first input section has a first rotary motor as the first actuator, a first input first link member, a first shaft not fixed to the base, and a first input second link member, the first rotary motor is fixed to the base, a base end of the first input first link member is fixed to a movable shaft of the first rotary motor, and a tip of the first input first link member and a base end of the first input second link member are rotatably supported around the first shaft;

the second input section has a second rotary motor as the second actuator, a second input first link member, a second shaft not fixed to the base, and a second input second link member, the second rotary motor is fixed to the base, a base end of the second input first link member is fixed to a movable shaft of the second rotary motor, and a tip of the second input first link member and a base end of the second input second link member are rotatably supported around the second shaft; and the two-dimensional position of the input side shaft can be freely manipulated by controlling the first rotary motor and second rotary motor.

9. The rotary actuator unit according to claim 7, wherein a tip of the link mechanism is a tip of the first input section and a tip of the second input section, which are rotatably supported around the input side shaft.

10. The rotary actuator unit according to claim 1, further comprising, a drive force transmission mechanism transmitting a rotation of the output link member, and a hollow shaft member that rotates in conjunction with the output link member by means of the drive force transmission mechanism.

11. The rotary actuator unit according to claim 1, further comprising, a drive force conversion mechanism that converts a rotation of the output link member into translational.

12. A joint unit for robots or heavy machinery having a rotary actuator unit according to claim 1.

13. The rotary actuator unit according to claim 1, wherein the output link member is configured to rotate 360 degrees or more around the output side shaft.

* * * * *